United States Patent
Dong

(10) Patent No.: US 8,655,933 B2
(45) Date of Patent: Feb. 18, 2014

(54) RANDOM NUMBER GENERATION AND MANAGEMENT METHOD, AND DEVICE

(76) Inventor: Jiguo Dong, Tokyo (JP)

( * ) Notice: Subject to any disclaimer, the term of this patent is extended or adjusted under 35 U.S.C. 154(b) by 552 days.

(21) Appl. No.: 12/811,408

(22) PCT Filed: Jun. 9, 2009

(86) PCT No.: PCT/JP2009/060815
§ 371 (c)(1),
(2), (4) Date: Jul. 1, 2010

(87) PCT Pub. No.: WO2010/013550
PCT Pub. Date: Feb. 4, 2010

(65) Prior Publication Data
US 2010/0287225 A1    Nov. 11, 2010

(30) Foreign Application Priority Data
Jul. 28, 2008    (JP) ................. 2008-213305

(51) Int. Cl.
*G06F 1/02*    (2006.01)

(52) U.S. Cl.
USPC ......................................... 708/250

(58) Field of Classification Search
USPC .................. 708/250, 253, 254, 256
See application file for complete search history.

(56) References Cited

U.S. PATENT DOCUMENTS

| 2003/0095659 A1* | 5/2003 | Ishihara et al. ............... 380/46 |
| 2005/0089169 A1* | 4/2005 | Kim et al. ................... 380/263 |
| 2010/0235418 A1* | 9/2010 | Dong ........................... 708/254 |
| 2010/0268751 A1* | 10/2010 | Hirata et al. ................ 708/255 |

FOREIGN PATENT DOCUMENTS

| JP | 9244876 A | 9/1997 |
| JP | 2006338045 A | 12/2006 |
| JP | 2008070727 A | 3/2008 |

* cited by examiner

*Primary Examiner* — Chuong D Ngo
(74) *Attorney, Agent, or Firm* — Che-Yang Chen; Law Office of Michael Chen

(57) ABSTRACT

The present invention relates to a method and device for generating and managing shorter random number series, such as ID and password, in which, for the given N bits binary series R and K dimensions multi-dimensional coordinate information i (i1, ..., ik, ..., iK), R is used for the following part of the decimal point of initial value $x_0$ for nonlinear function, i is transformed into coordinates of each dimension, i1, ..., ik, ..., iK, and the initial value $x_0$ and ik are stored in the register, through operations to generate and manage multi-dimensional random number $R_i$.

2 Claims, 7 Drawing Sheets

$\underbrace{r_0 r_1 \ldots r_{N-1}}_{R_0} \underbrace{r_N r_{N+1} \ldots r_{2N-1}}_{R_1} \ldots \underbrace{r_{iN} r_{iN+1} \ldots r_{(i+1)N-1}}_{R_i} \ldots \underbrace{r_{(M-1)N} r_{(M-1)N+1} \ldots r_{MN-1}}_{R_{M-1}}$

FIG. 3

| product number | Model number | | | Manufacture number | | | |
|---|---|---|---|---|---|---|---|
| hexadecimal | M | C | 780 | C | 42875 | | |
| | 4D | 43 | 2C4 | 43 | 0A77B | | |
| ik | 4 | 3 | 4 | 4 | A | 7 | B |
| | D | 4 | 2 | 3 | 0 | 7 | |
| k | 1 | 2 | 3 | 4 | 5 | 6 | 7 | 8 | 9 | 10 | 11 | 12 | 13 | 14 |

FIG. 6

| i (i1,...,i14) | t' (sec) | t (sec) |
|---|---|---|
| 0,...,0 (minimum) | 0.000388 | 0.000421 |
| 4,D,4,3,2,C,4,4,3,0,A,7,7,B | 0.002441 | 0.002781 |
| F,...,F (maximum) | 0.006214 | 0.006234 |

(Genuine Intel(R) CPU 1.5GHz 0.99GB RAM)

FIG. 7

RANDOM NUMBER GENERATION AND MANAGEMENT METHOD, AND DEVICE

FIELD OF INVENTION

The present invention relates to a random number generation and management method and device.

DESCRIPTION OF THE RELATED ART

There is not only a situation of a large number of random numbers generated and used in a short time during computer simulation, but also a situation of random numbers with finite length (such as 128 bits) generated and used in identification (ID) and password (PW). Even ID and PW require stronger security management, in fact, there is not yet a device that achieves effective management. There are often reports related to lost memory media storing user's ID and other information.

The management for the random number array of ID and PW is difficult, and currently the information is only stored in the storage of memory media. User's ID and other information stored in the memory media being lost under the state without encryption shows the difficulty of the management.

Pseudo-random number can be regenerated. When the same random number is needed during computer simulation, it can be generated if the initial value generating the random number is kept. That is, the management for the initial value generating the random number is regarded as the management for the very long random number series.

On the premise of a sufficiently long periodic binary series $(r_0\ r_1\ \ldots\ r_t\ \ldots)$ (discrete-time $t=0, 1, 2, \ldots$), we consider the following ID and PW generating and managing system. ID and PW system is generated and managed through an initial value by secret management and t by public management. When needed, the initial value and t are input in the system to generate the corresponding ID or PW. But, it is clear that it takes a long time to generate random number series (ID, PW) corresponding to a large t, and the system will lose its practical function, such as $t=2^{64}$.

On the other hand, because the value series generated by the chaos function has special properties, such as nonlinearity, initial value sensitivity, calculation unidirectionality, etc, it is expected to be used for random number generation. In which, some are used for generating random number through logistic map (Equation 1) (hereinafter referred to as LMAP), and for inspection to the generated series (non-patent literatures 1-3).

$$x_{t+1} = 4x_t(1-x_t) \quad \text{Equation 1}$$

$(0 < x_t < 1, t=0, 1, 2, \ldots)$

Non-patent literature 1

Ulam, S. M. and Von Neumann, J., "On Combination of Stocastic Determistic Processes", Bull. AMS., Vol. 53, p. 1120 (1947)

In this literature, Equation 1 is proposed to be used for generating random number.

Non-patent literature 2

Tohru KOHDA and Eiji OGATA, "Bernoulli trials and Chaotic Trajectories in the Logistic map", IEICE A (Japanese), Vol. J68-A No. 2 pp. 146-152 (1985)

In this literature, the binary series generated through Equation 1 and the threshold value defined as 0.5 is complete random number series.

Non-patent literature 3

K. Shono, "Chaos engineering", Springer-Verlag Tokyo, Tokyo, 2002.

In this literature, Equation 1 applies to an effective method for high-speed random number generated, in which fixed decimal point calculation is proposed to implement hardware-based.

The calculation of chaos function LMAP has unidirectionality, that is, starting from a certain initial value $x_0$, $x_t$ ($t=1, 2, \ldots$) can be calculated individually, but $x_0$ cannot be calculated from the calculated $x_t$. This is because if the inverse function of the second order function LMAP, $x_t=(1\pm\sqrt{(1-x_{t+1})/2}$, is used for reverse calculation for $x_t$, one of the two possible states must be chosen (the choice between + or − symbol).

In the application, the binary series generated through the LMAP is the binary series generated when the threshold value is 0.5 to $x_t$, (if $x_t \geq 0.5$, the output is 1, and if $x_t < 0.5$, the output is 0). Moreover, the inventor of the application confirms that the LMAP has the following features.

When the calculation accuracy is N bits, from $t=0$ to $t=N-1$, if there are continuously generated N bits binary series (the threshold value is 0.5), the $x_0$ generating the binary series can be calculated through the inverse function of the LMAP. The + or − symbol is chosen on the basis of the binary value corresponding to the same t (1: +, 0: −). This is because the LMAP is calculated according to the divergent results of the lyapunov exponent, and the inverse function of the LMAP is calculated according to the convergent results of the lyapunov exponent.

It is clear that the binary series generated by the LMAP with such features is improper to be used for the random number of information security. For the binary series generated by a very long LMAP, if the foremost bits longer than the calculation accuracy is known, through calculating the inverse function of the LMAP on the binary bits, $x_0$ is obtained, and through calculating the LMAP on the $x_0$, all bits of the very long binary series can be calculated. But, the upper degree bits (generated earlier) cannot be calculated through the lower degree bits (generated later) of the binary series generated through the LMAP.

If the calculation accuracy is N bits, the number of continuous 0's generated during the calculation of the LMAP is less than N/2. The feature limits the possibility of the combination number for the binary series generated by the LMAP, but simultaneously ensures that when the N bits are extracted from the binary series to make a new initial value, the new initial value does not occur the value called a black hole, such as 0, 0.25, 0.5, 0.75, etc.

When the LMAP is calculated in limited calculation accuracy, the initial value sensitivity can be observed in the following forms. Through two initial values, in which except for the lowest bit, the other bits in the two initial values are same, we can ensure that the internal states $x_t$ are in completely different tracks after N times calculation (there is not any relationship between the two internal states), for example, the results of the initial value 0.0 . . . 01 and 0.0 . . . 010 after 128 times calculation in 128 bits calculation accuracy are respectively 0.0100 . . . 0100 and 0.1100 . . . 0110 (only upper degree 4 bits and lower degree 4 bits are shown). There are two meanings.

Firstly, because of the calculation in limited calculation accuracy, the lower degree bits are cast out, thus there is no relationship between the state after N times calculation and the initial state, that is, the state after N times calculation, not been calculated, cannot be estimated.

Secondly, even if there are two initial values, in which except for the lowest bit, the other bits in the two initial values are same, there is no correlation between the binary series individually generated by the two initial values, and the content of one series cannot be estimated through the other series.

The features of the binary series generated through the above LMAP have important implications in the following method for generating multi-dimensional random number.

DISCOVERY OF THE INVENTION

The Issue Resolved by the Invention

The object of the present invention is to provide a method and device for generating and managing random number, which is easily realized in general-purpose computer and special hardware, to generate and manage shorter random number series, such as ID and PW.

The method for generating and managing random number of the present invention (claim 1) is for the given N (N is an integer, and N≥2) bits binary series R and K dimensions multi-dimensional coordinate information i (i1, ..., ik, ..., iK) (ik are integer, and ik≥0, k:1, 2, ..., K), in which R is used for the following part of the decimal point of initial value $x_0$ for nonlinear function, $x_{t+1}=4x_t(1-x_t)$ (herein after referred to as LMAP, $0<x_t<1$), i is transformed into coordinates of each dimension, i1, ..., ik, ..., iK, and $x_0$ and i1, ..., ik, ..., iK are stored in the register; the method with the features including:

1) for the initial value $x_0$ and ik stored in the register, the chaos computing unit repeatedly implements the calculation of the LMAP in N bits calculation accuracy through fixed decimal point calculation, to generate N bits binary series $B_{ik}$, and the bits of $B_{ik}$ are individually constituted by $b_{k\cdot 0}, b_{k\cdot 1}, \ldots$ and $b_{k\cdot N-1}$, wherein $b_{k\cdot 0}=[2\times x_{N\times i\ k}]$, $b_{k\cdot 1}=[2\times x_{N\times i\ k+1}]$, ... and $b_{k\cdot N-1}=[2\times x_{N\times i\ k+N-1}]$, [ ] means the calculation of casting out the following part of the decimal point;

2) $B_{ik}$ is then used for the following part of the decimal point of initial value $x_0$ through the chaos computing unit repeatedly implementing the calculation of the LMAP to generate N bits binary series $R_{i1, \ldots, ik}$, $R_{i1, \ldots, ik}$ is $R_{i1}$ when k=1, ..., $R_{i1, \ldots, ik}$ is $R_{i1, \ldots, iK}$ when k=K, and the bits of $R_{i1, \ldots, ik}$ are individually constituted by $r_{k\cdot 0}, r_{k\cdot 1}, \ldots$ and $r_{k\cdot N-1}$, wherein $r_{k\cdot 0}=[2\times x_N]$, $r_{k\cdot 1}=[2\times x_{N+1}]$, ..., $r_{k\cdot N-1}=[2\times x_{2N-1}]$; and store the binary series $R_{i1, \ldots, ik}$ in the random number register.

3) the $R_{i1, \ldots, ik}$ stored in the above random number register is used for the following part of the decimal point of initial value $x_0$ of the LMAP and stored in the above register.

The above operations 1), 2) and 3) are implemented as the order of k=1, 2, ..., K, but $R_{i1, \ldots, iK}$ do not perform the transformation of the initial value $x_0$ of the LMAP when k=K, to generate the method for generating and managing random number with the feature of multi-dimensional random number $R_i$.

The device for generating and managing random number of the present invention (claim 2) are with the features of the following parts:

input unit of generating and managing information for random number, which receives N (N is an integer, and N≥2) bits binary series R as the initial value information to generate random number, and K dimensions multi-dimensional coordinate i (i1, ..., ik, ..., iK) (ik is an integer, and ik≥0, and K is an integer, and K≥1) as the multi-dimensional coordinate information;

initial value/multi-dimensional coordinates transformation unit, which transforms R, the following part of the decimal point of initial value $x_0$ for nonlinear function, $x_{t+1}=4x_t(1-x_t)$ (herein after referred to as LMAP, $0<x_t<1$), into $x_0$, and transforms I into multi-dimensional coordinates i1, ..., ik, ..., iK to prepare for the calculation of the LMAP to generate random number;

register, which stores the initial value $x_0$ and multi-dimensional coordinates it i1, ..., ik, ..., iK transformed by the initial value/multi-dimensional coordinates transformation unit;

chaos computing unit generating chaos binary series, which repeatedly implements the calculation of the LMAP in N bits calculation accuracy through fixed decimal point calculation, on the basis of the initial value $x_0$ and multi-dimensional coordinates stored in the register, to generate N bits binary series $B_{ik}$, the bits of $B_{ik}$ are individually constituted by $b_{k\cdot 0}, b_{k\cdot 1}, \ldots$ and $b_{k\cdot N-1}$, wherein $b_{k\cdot 0}=[2\times x_{N\times i\ k}]$, $b_{k\cdot 1}=[2\times x_{N\times i\ k+1}]$, ... and $b_{k\cdot N-1}=[2\times x_{N\times i\ k+N-1}]$, and [ ] means the calculation of casting out the following part of the decimal point; and then, $B_{ik}$ is used for the following part of the decimal point of initial value $x_0$ and transformed into $x_0$ through the chaos computing unit repeatedly implementing the calculation of the LMAP to generate N bits binary series $R_{i1, \ldots, ik}$, $R_{i1, \ldots, ik}$ is $R_{i1}$ when k=1, ..., $R_{i1, \ldots, ik}$ is $R_{i1, \ldots, iK}$ when k=k, and the bits of $R_{i1, \ldots, ik}$ are individually constituted by $r_{k\cdot 0}, r_{k\cdot 1}, \ldots$ and $r_{k\cdot N-1}$, wherein $r_{k\cdot 0}=[2\times x_N]$, $r_{k\cdot 1}=[2\times x_{N+1}]$, ..., $r_{k\cdot N-1}=[2\times x_{2N-1}]$;

random number register, which stores N bits binary series $R_{i1, \ldots, ik}$ output by the chaos function computing unit; and random number generation control unit, which implements the following operations, including the operation of the input unit of generating and managing information for random number, the operation of the initial value/multi-dimensional coordinates transformation unit, the calculation of the chaos function computing unit, and the calculation of $x_0$ transformed from $R_{i1, \ldots, iK}$, as the following part of decimal point of the initial value $x_0$ of the LMAP, as the order of k=1, 2, ..., K, but $R_{i1, \ldots, iK}$ do not perform the transformation of the initial value $x_0$ of the LMAP when k=K, to generate multi-dimensional random number $R_i$.

EFFECT OF THE INVENTION

Random number series in the present invention can be quickly generated (regenerated) to be placed at any coordinate position among plenty of random number series in multi-dimensional coordinate space. Therefore, as shown in FIG. 1, we can construct a system for generating and managing random number, to generate and manage binary series $R_i$ (ID, PW) through managed binary series R and regulated multi-dimensional coordinate information i(i1, ..., ik, ..., iK).

Because of the chaos function (LMAP) used in the present invention, there is no linear relationship between the $R_i$ generated by regulated multi-dimensional coordinate information i (i1, ..., ik, ..., iK). Thus, R cannot be estimated through certain random number series $R_i$ and multi-dimensional coordinate information i (i1, ..., ik, ..., iK) thereof. Also, the random number series generated by other multi-dimensional coordinate information cannot be estimated.

Still because of the LMAP calculated through fixed decimal point calculation in the present invention, the system for generating and managing random number proposed by the present invention is easily constructed by a system implementing integer arithmetic, (such as multiplication, addition, subtraction, and logical operations) whether it is a software or hardware system. Furthermore, the present invention makes the low price of the system for generating and managing random number possible to be an expected form in industrial technology.

BRIEF DESCRIPTION OF THE DRAWINGS

FIG. 3 shows the method for generating one-dimensional random number;

FIG. 6 is a table showing the product numbers of industrial products transformed into multi-dimensional coordinates; and FIG. 7 is a table showing the time needed for the random number generated by the method for generating multi-dimensional random number.

DETAILED DESCRIPTION OF THE INVENTION

Hereinafter, the embodiments and the effects of the present invention will be described with reference to the drawings.

Figure 2:
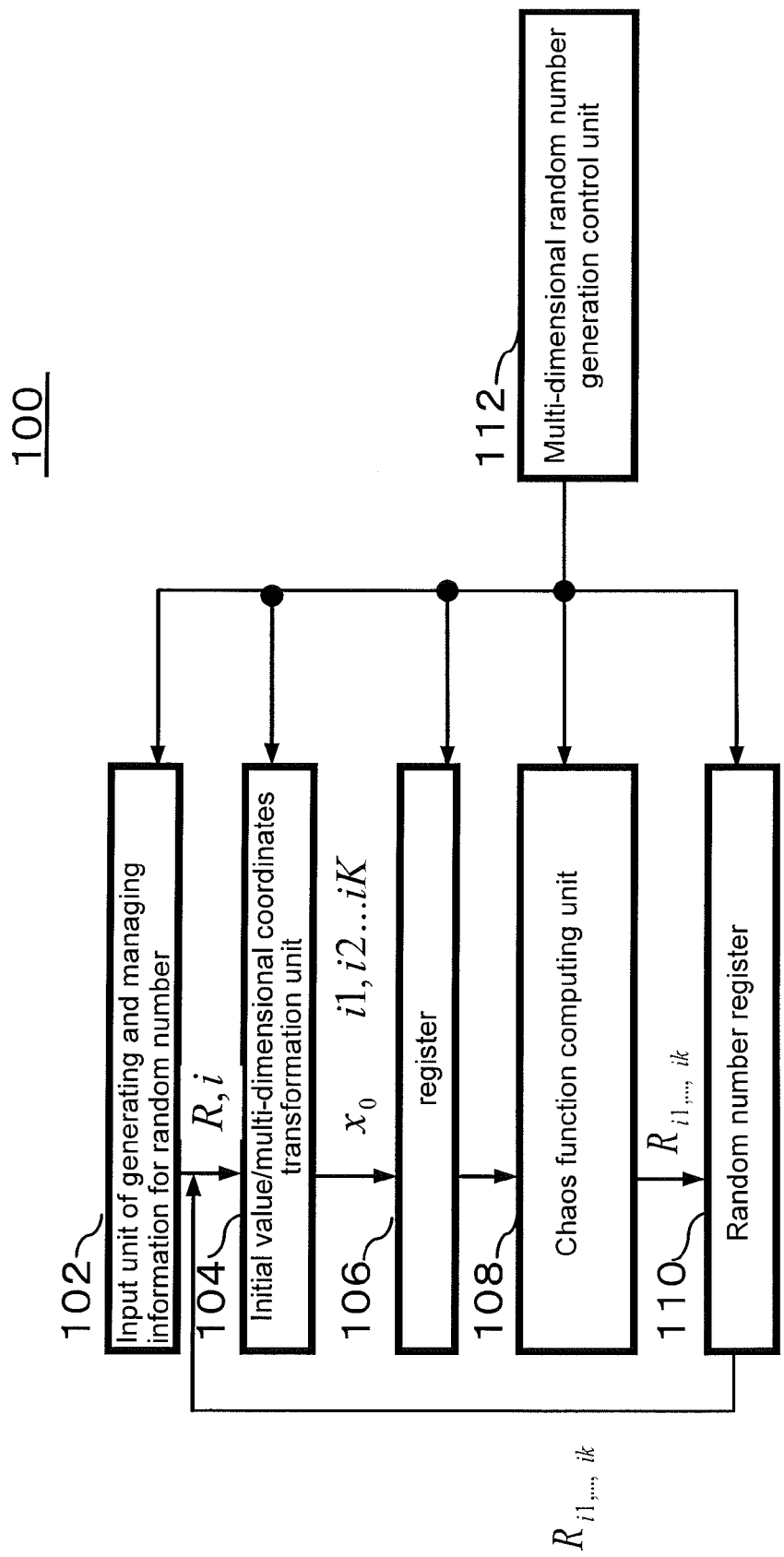
FIG. 2 is a composition diagram showing the implementation form of a device for generating random number according to the present invention.
Figure 4:
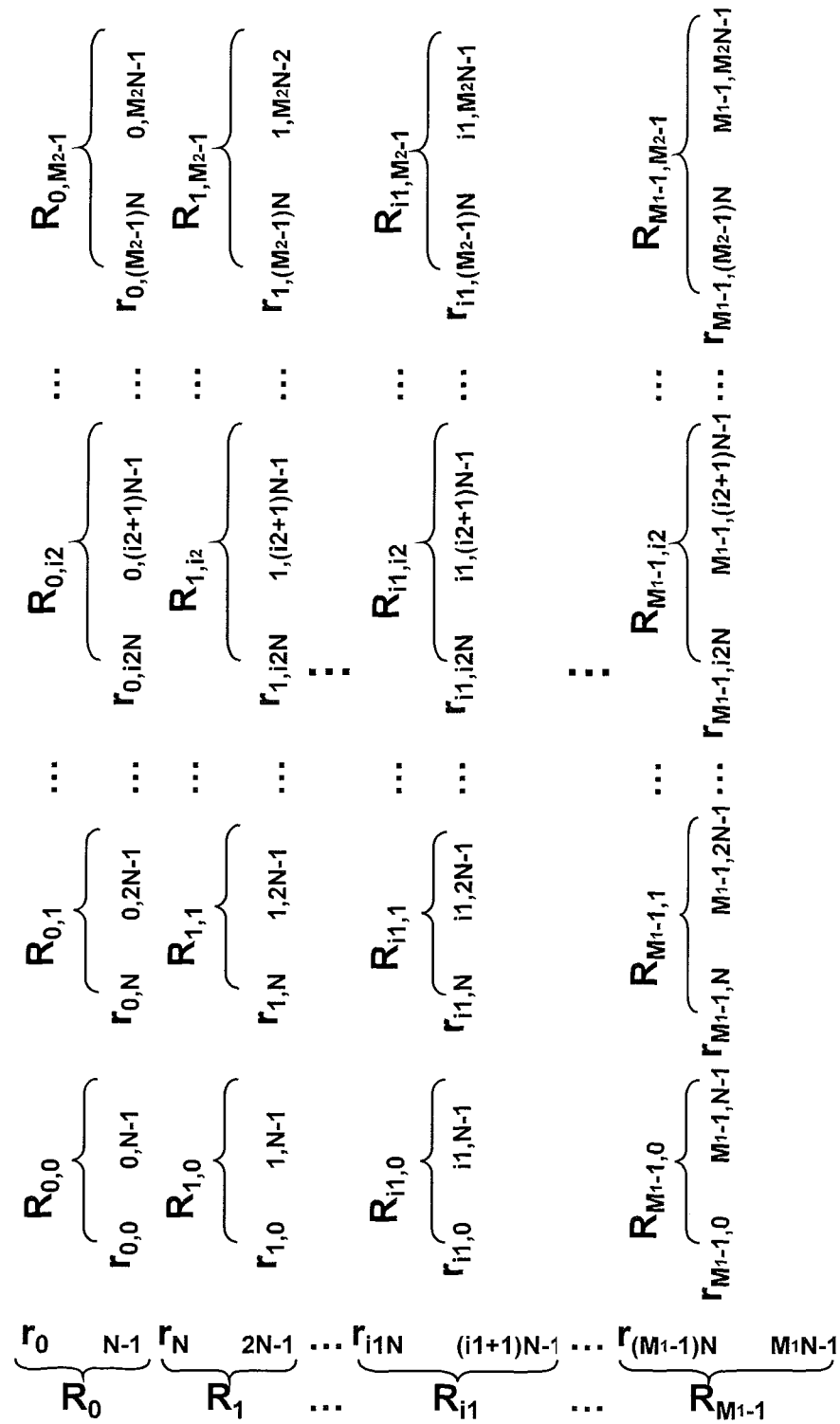
FIG. 4 shows the method for generating two-dimensional random number.

FIG. 2 shows an embodiment of the present invention, which is the device for generating and managing random number 100. The device for generating and managing random number 100 in the embodiment generates N bits binary series $R_{i1, \ldots, ik}$ by way of chaos computing unit, through transforming N bits binary series R into initial value $x_0$ of the LMAP, and on the basis of $x_0$ and multi-dimensional coordinate information i, and then the calculation of transforming $R_{i1, \ldots, ik}$ into $x_0$ is repeatedly implemented for K times, to generate K-dimensional random number $R_i$. The device for generating and managing random number 100 is instituted by input unit of generating and managing information for random number 102, initial value/multi-dimensional coordinates transformation unit 104, register 106, chaos function computing unit 108, random number register 110, and random number generation control unit 112.

The input unit of generating and managing information for random number 102 receives N bits binary series R and multi-dimensional coordinate information I (i1, . . . , iK).

The initial value/multi-dimensional coordinates transformation unit 104 transforms the input binary series R or the binary series $R_{i1, \ldots, ik}$ generated during the generation of the multi-dimensional random number into $x_0$, and transforms the input multi-dimensional coordinate information i into each dimension coordinates i1, . . . , iK for fixed decimal point calculation to generate multi-dimensional random number.

The register 106 stores $x_0$ and i1, . . . , iK transformed in the initial value/multi-dimensional coordinates transformation unit 104.

The initial value stored in the register 106 is used by the chaos function computing unit 108 as the order of multi-dimensional coordinate ik (k=1, 2, . . . , K) to repeatedly calculate the LMAP, to generate N bits binary series $R_{i1, \ldots, ik}$.

The detailed operations of the chaos function computing unit are described as following.

Firstly, the initial value $x_0$ and multi-dimensional coordinate ik stored in the register 106 are used by the chaos function computing unit 108 to calculate the LMAP for N×ik times.

Next, while in the calculation of the LMAP, $b_{k \cdot 0}=[2 \times x_{N \times i \ k}]$, $b_{k \cdot 1}=[2 \times x_{N \times i \ k+1}]$, . . . and $b_{k \cdot N-1}=[2 \times x_{N \times i \ k+N-1}]$ are calculated, in which [ ] means the calculation of casting out the following part of the decimal point, to generate N bits binary series $B_{ik}(b_{k \cdot 0}, b_{k \cdot 1}, \ldots, b_{k \cdot N-1})$.

Then, $B_{ik}$ is used for the following part of the decimal point of initial value $x_0$ of the LMAP, to calculate the LMAP for N times.

And then, while in the calculation of the LMAP, $r_{k \cdot 0}=[2 \times x_N]$, $r_{k \cdot 1}=[2 \times x_{N+1}]$, . . . and $r_{k \cdot N-1}=[2 \times x_{2N-1}]$ are calculated, to generate N bits binary series $R_{i1, \ldots, ik}(r_{k \cdot 0}, r_{k \cdot 1}, \ldots, r_{k \cdot N-1})$.

Because of the above additional calculation, we can cut off the above-mentioned possibility of speculating the lower degree bits from the upper degree bits in the binary series generated through the LMAP.

The random number register 110 is used for storing the binary series output by the chaos function computing unit 108.

The random number generation control unit 112 controls the operations of every unit to generate multi-dimensional random number series.

The random number generation control unit 112 repeatedly calculates on the basis of K dimensions multi-dimensional information as the order of k=1 to k=K, through the chaos function computing unit, and the outputs are stored in the random number register 110; if k<K, the random number series stored in the random number register 110 is transformed into $x_0$ through the initial value/multi-dimensional coordinates transformation unit 104, and the $x_0$ is stored in the register 106, and the calculation is gone on; if k=K, the N bits binary series stored in the random number register 110 is used for the random number $R_i$, and the calculation is terminated.

The meaning and effect of the multi-dimensional random number are described as following.

We consider the fixed decimal point calculation to the LMAP with N bits calculation accuracy to generate N bits binary series.

N bits initial value $x_0$ is input to generate the required number of binary series r ($r_0, r_1, \ldots$). We assume that the generation speed of the random number generator is S bps (bits/sec), and the operational time, except for generating binary series, is too short, so not be counted. Here we take a look at that, if the random number generator generates M×N (M is an integer, and M≥1) bits random number, the required time for generating any one of $R_i$ through initial value $x_0$, when the random number is divided into M series and each one is N bits binary series.

The series $R_i$ generated through this way can be imagined to be put on a straight line (as shown in FIG. 3), thus, the generation method is referred to a method for generating one dimension random number series.

It is clear that, because of N bits series, the required time for generating the first series $R_0$ through $x_0$ is N/S. The required time for generating the second series $R_1$ through $x_0$ is 2N/S because it includes the time for generating the first random number series. Thus, the required time for generating the ith series $R_{i-1}$ through $x_0$ is i×N/S.

Because the more generated random number series, the better, a greater M is expected. But, as for such method for continuously generating random number series through one initial value, M cannot be very large, such as M=$2^{64}$, even if the generation speed is $2^{40}$ bps, the average generating time for N bits series is (1+$2^{64}$)×N/$2^{40}$>$2^{24}$ seconds.

We will consider the following method for generating random number. Here, we assume the M is $M_1 \times M_2$ ($M_1$, $M_2$ are integers, and $M_1$, $M_2 \geq 1$), $M_1$ series N bits random number series are generated through N bits initial value $x_0$, the generated $M_1$ series N bits random number series are used for new initial values, to individually generating $M_2$ series N bits random number series. The generated N bits random number series are represented as $R_{i1,i2}$ ($i1=0, \ldots, M_1-1$, $i2=0, \ldots, M_2-1$).

The series $R_{i1,i2}$ generated through the above way can be imagined to be put on a two-dimensional plane (coordinates), thus, the generation method is referred to a method for generating two-dimensional random number series.

It is clear that the total number of $R_{i1,i2}$ is $M_1 \times M_2 = M$, the required time T for generating any one $R_{i1,i2}$ through initial value $x_0$ is as following.

$$T_{R_{0,0}} = (1 \times N + 1 \times N)/S = 2N/S$$

$$T_{R_{0,1}} = (1 \times N + 2 \times N)/S = 3N/S$$

$$T_{R_{0,i2}} = (1 \times N + (i2+1) \times N)/S = (i2+2)N/S$$

$$T_{R_{i1,i2}} = ((1+i1) \times N + (i2+1) \times N)/S = (i1+i2+2)N/S$$

That is, as for the required time for generating one random number series, the minimum is $2N/S$, and the maximum is $(M_1+M_2)N/S$, compared with the longest time, $M \times N/S = (M_1 \times M_2)N/S$, for the method for generating one dimension random number series, the difference is self-evident.

We assume that K dimensions and $M = M_1 \times \ldots \times M_K$, $M_1$ series N bits random number series are generated through N bits initial value $x_0$. Then, the generated $M_1$ series N bits series are used for new initial values, to individually generate $M_2$ series N bits random number series. Till $M_K$, the transformations for new initial values are performed for $K-1$ times to generate series $R_i$. The series $R_i$ can be imagined to be coordinates (i: i1, i2, ..., iK) put in K dimensions space, thus, the generation method is referred to a method for generating K dimensions random number series. We can understand that, the required time for any one series in K dimensions coordinate space is $(K+i1+i2+\ldots+iK)N/S$, the minimum is $KN/S$, the maximum is $(M_1+M_2+\ldots+M_K)N/S$, and the average time is $(K+M_1+M_2+\ldots+M_K)N/(2S)$.

The meanings of every parameter N, K(k), M(Mk) in the method for generating multi-dimensional random number are described as following.

N is calculation accuracy. Therefore, the variety of initial value (initial value space) available is $2^N-4$, except for 0...0, 010...0, 10...0, 110...0 (0, 0.25, 0.5, 0.75). But, because the length of chaos state generated through certain initial value $x_0$ is similar to $2^{N/2}$, we can estimate the value of non-periodic M is $2^{N/2}/N$. Actually, when N is assumed to be a value between 32 and 64, the search result through numerical calculation to the length of non-periodic M is similar to $2^{N/2}$. This is because the generation of the initial values through repeatedly calculation makes the periodicity of multi-dimensional random number generator to be longer than that of the original LMAP.

The coordinate volume M is the total of the series generated through initial value $x_0$. The value is generally restricted by the periodicity of random number generator. However, if same random number series is allowed being placed in multi-dimensional space (an unspecific location), there is no such restriction.

The space of every dimension coordinate depends on $M_k$ ($k=1, 2, \ldots, K$). Also, the generation speed of $R_i$ depends on $M_k$. When $M_k$ is assumed to be larger, the average generation speed of $R_i$ would be much slower. $M_k$ and k together have the classification function to $R_i$. Namely, the information with specific meanings (such as time, name, organization (department), etc.) can be possessed. That is, when the decision for the appropriate value of $M_k$ is made, not only generation speed of random number, but also classification ease, must be thought over. The more effective representing way for coordinate space is assumed $M = 2^m$, $m = m_1 + \ldots + m_K$ ($m_1, \ldots, m_K$ are integers, and $m_1, \ldots, m_K \geq 0$).

K is used for dimension number, possessing classification function. When M is constant, if K is larger, the average value of $M_k$ will be smaller, and the average generation speed of $R_i$ will be faster. However, if the individual $M_k$ is extremely larger, generation speed of $R_i$ may be extremely slower. This is because, like the method for generating one dimension random number series, if the coordinate number in certain dimension is assumed too large, the average generation time in this dimension will be very long. Therefore, the setting of K is not only following the classification function, but also making individual $M_k$ not too large. That is, even of the same classification, there is no need to represent as the same dimension coordinate. In the classification, when the individual $M_k$ is too large, it can be represented as plural dimensions.

K(k) can be divided.

We will think about a multi-dimensional random number generation system, including N bits calculation accuracy, initial value $x_0$, and K dimensions, and the magnitude of every dimension is $M_1, M_2, \ldots, M_K$. We inspect the state of k dimension in the intermediate process.

When $k=1$, $M_1$ N bits binary series $R_{i1}$ are generated through initial value $x_0$. When $k=2$, $M_1$ N bits binary series $R_{i1}$ (initial value in the intermediate process) are generated through initial value $x_0$, then, $M_2$ N bits binary series $R_{i1,i2}$ are individually generated through initial value in the intermediate process. Namely, total $M_1 \times M_2$ N bits binary series can be generated through initial value $x_0$. Also, the k dimension in intermediate process can generate $M_1 \times M_2 \times \ldots \times M_k$ initial values in intermediate process.

Here, we assume $k = Ku$ and $K = Ku + Kd$, then $Kd = K - Ku$. That is, which is the multi-dimensional random number generation system constituted by the upper degree dimension of initial value $x_0$ with Ku dimensions and the values of every dimension are $M_1, M_2, \ldots, M_{ku}$. For example, $M_1 \times M_2 \times \ldots \times M_{ku}$ N bits binary series (the initial value in intermediate process) generated through the system constituted by the upper degree dimension of Ku dimensions are used for the multi-dimensional random number generation system (Kd dimensions and the values of every dimension are $M_{ku+1}, M_{ku+1}, \ldots, M_K$) of every initial value, which is constituted by the lower degree dimension.

As mentioned above, two K's (Ku, Kd) correspond to a multi-dimensional random number generation system, through dividing K, the multi-dimensional random number occurs system-division, and when the multi-dimensional random number generation system is divided, through Ku dimension as the margin, not all lower degree dimensions should be divided from the multi-dimensional random number generation system. Only the random number $R_{i1,i2,\ldots,iku}$ at the arbitrary coordinates i1, i2, ..., i(ku) in intermediate process are output to be the initial value of the new lower degree multi-dimensional random number generation system, arbitrary lower degree multi-dimensional random number generation system can be divided from the original multi-dimensional random number generation system.

Furthermore, it is clear that the inverse operation of the system-division should connect (integrate) with the divided system. However, the individual coordinate information in intermediate process dimension during division should be kept. In other words, the intermediate dimensional coordinate information of the divided system with the need of re-connection should be kept. The intermediate process coordinate of completely independent divided system without the need of re-connection may be removed.

The above describes the division for K into Ku and kd, and, of course, more division can be performed as needed through same method.

The value of $R_i$ generated from multi-dimensional coordinates i (i1, i2, ..., iK) through initial value $x_0$ and that of R, generated from multi-dimensional coordinates i (i (ku+1), i (ku+2), ..., iK) through initial value $R_{i1, i2, ..., iku}$ are same. That is, initial value $R_{i1, i2, ..., iku}$ can be obtained from initial value $x_0$, but initial value $x_0$ cannot be obtained from $R_{i1, i2, ..., iku}$. As for the above initial value with such relationship, initial value $x_0$ is referred to upper degree initial value, and $R_{i1, i2, ..., iku}$ is referred to lower degree initial value.

By way of the multi-dimensional random number generation method with the above features, we can construct random number generation system with grade structure. That is, the competence of the upper degree initial value $x_0$ and that of the lower degree initial value $R_{i1, i2, ..., iku}$ are different, the keeper of initial value $x_o$ has greater competence than that of $R_{i1, i2, ..., iku}$.

Figure 5:
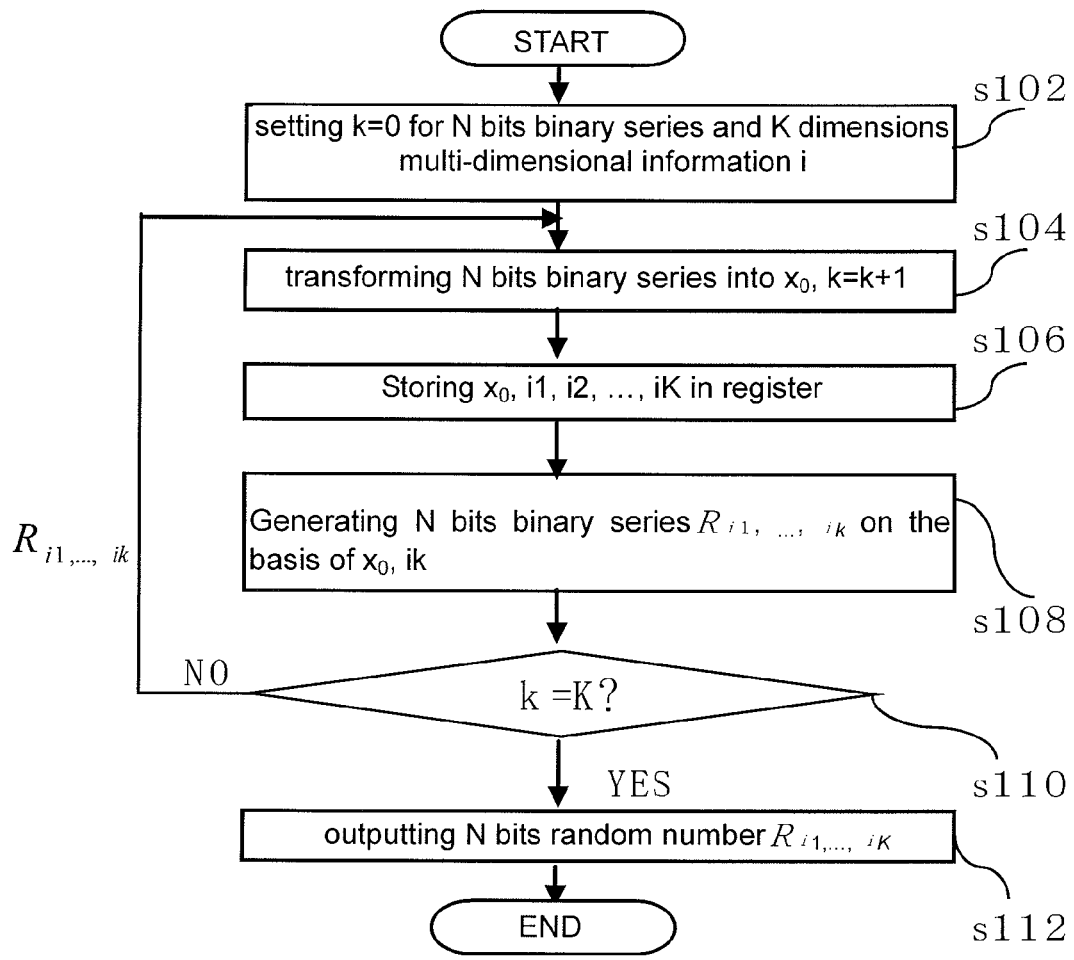
FIG. 5 is a flowchart showing the embodiment of the action of the device for generating and managing random number 100.

FIG. 5 is a flowchart showing an embodiment of the action of the device for generating and managing random number 100. The device for generating and managing random number 100 shown in the flowchart starts action according to the order generated by the random number.

The input unit of generating and managing information for random number 102 receives the input N bits binary series R and multi-dimensional coordinate information i, and variable k is assumed as k=0. Then, the initial value multi-dimensional coordinates transformation unit 104 makes k=k+1, and transforms the received N bits binary series R into $x_0$ (S104) and stores $x_0$ and multi-dimensional coordinate information (i1, i2, ..., iK) into the register 106 (S106). According to $x_0$ and multi-dimensional coordinate information ik stored in the register 106, the chaos function computing unit 108 further generates N bits binary series $R_{i1, i2, ..., ik}$, and stores them into the random number register 110 (S108); when k<K (dimension number), N bits binary series $R_{i1, i2, ..., ik}$ are input the initial value/multi-dimensional coordinates transformation unit 104 (S110), and re-calculation is performed from (S104). When k=K, N bits binary series $R_{i1, i2, ..., ik}$ are output as random number (S112), and the operation of the device for generating and managing random number 100 in the flowchart terminates.

Here, by way of the embodiment of the system for generating and managing random number, the effect of the present invention is confirmed through initial value sensitivity, irrelevancy of adjacent coordinates, generation speed, and system-division.

Industrial products include the identification of the product mark (number). For example, model number, manufacture number, batch number, manufacture date, etc, these numbers are necessary for managing related information of the product and after-sales service. Of course, these numbers must be managed. Most of the numbers of products are regular consecutive numbers. Because of regularity, the message content in these numbers is less and easy to be managed. However, on the other hand, it is easy to infer other numbers from a number and to be illegally used, such counterfeit attached with authentic number to pose as genuine article. If the regular number is integrated with irregular identification ID number (random number), the product number cannot be inferred.

However, using the irregular random number will make it difficult to manage near-infinite numbers of industrial products. The multi-dimensional random number generation method proposed in the present invention is effective to manage the irregular identification ID (random number series).

We assume three elements (R, i, $R_i$) corresponding to multi-dimensional random number generation method, which transform (unique) product number identifying product into multi-dimensional coordinate, and integrate the generated product identification ID (random number $R_i$) with the product number to make it non-inferable. At this point, initial value $x_0(R)$ becomes the management key for managing product identification ID. The correct initial value $x_0$ and product number can generate (regenerate) corresponded product identification ID. The regular product number can be inferred, but the attached product identification ID cannot be. That is, without initial value $x_0$, it is impossible to obtain correct combination of product number and product identification ID.

The following is an example of simplified generation for identification ID of the product with model number MC780 and manufacture number C042875.

The generation for identification ID needs to transform the product number into multi-dimensional coordinate. As shown in FIG. 6, the transformation for model number and manufacture number is performed. (The English letters are represented as hexadecimal in ASCII code, and decimal digits are represented as hexadecimal.)

We assume dimension number K=14, the values of every dimension are $M_1=M_2=...=M_{14}=16$, and management key is 128 bits initial value $x_0$=0 ... 01 (hexadecimal), thus, $R_i$ calculated through multi-dimensional random number generation method is represented in hexadecimal as B44768B06B7A25D464F3523552BD0DFB. The corresponded multi-dimensional coordinate is represented in hexadecimal as (i=4,D,4,3,2,C,4,4,3,0,A,7,7,B).

Firstly, multi-dimensional coordinate i is fixed, and $x_0$ is given minor changes, to identify the generated changes of $R_i$. The following shows the embodiment when multi-dimensional coordinate i is (4,D,4,3,2,C,4,4,3,0,A,7,7,B). When $x_0$ is 0 ... 01 and 0 ... 02 (32 digits in hexadecimal), $R_i$ is (B44768B06B7A25D464F3523552BD0DFB) and (8849A5994E6b861F6298CFB4C7C71E9F), respectively. We can confirm the initial value sensitivity.

Then, initial value is fixed, and multi-dimensional coordinate i is given minor changes, to identify the generated changes of $R_i$. The following shows the embodiment when initial value $x_0$ is 0 ... 01. When multi-dimensional coordinate i is (4,D,4,3,2,C,4,4,3,0,A,7,7,B) and (4,D,4,3,2,C,4,4,3,0,A,7,7,C), R is (B44768B06B7A25D464F3523552BD0DFB) and (BA1359675D951215D6F14411426D1E13), respectively. We can confirm the irrelevancy of adjacent coordinates.

From the above results, we can confirm the following effects; as for the random number generator constructed through multi-dimensional random number generation method, even if the system configuration is same, there is no relationship between the random numbers generated through different initial values and same multi-dimensional coordinate. That is, even the system are constructed the same, it is impossible to infer the initial value from the random number of the same multi-dimensional coordinate. Also, from the random number series at certain multi-dimensional coordinate, it is impossible to infer the random number series at the adjacent multi-dimensional coordinate.

As shown in the above, when the generation speed of binary series is given, the required time for generating the random number series at certain multi-dimensional coordinate is obtained. At this point, we assume that the operation time, except for generating binary series, is too short, so not be counted. Here, the generation time calculated through approximation is inferred time t, the actual required time for generation is example time t', and when the generation speed of binary series is 4.9 Mbps, the results of the both are shown as in FIG. 7. We can confirm which are close and the generation speed can be practically applied.

In the system for generating product identification ID, the product number is instituted by model number and manufacture number, that is, the product number is divided into a portion for managing model (model number) and a portion for managing the product of the model (manufacture number). Here, the product number is divided into model number and manufacture number, to confirm the random numbers respectively generated in divided and undivided situations.

When initial value $x_0$ is 0 . . . 01 and multi-dimensional coordinate i is (4,D,4,3,2,C,4,4,3,0,A,7,7,B), the random number series $R_i$ is generated as shown in the above. Firstly, the multi-dimensional coordinate is divided into (4,D,4,3,2,C,4) (model management) and (4,3,0,A,7,7,B) (the product of the model). Then, the random number series $R_{i'}$ is generated through initial value $x_0$ (0 . . . 01) and multi-dimensional coordinate i' (4,D,4,3,2,C,4). And then, the random number series $R_{i''}$ is generated through the initial value transformed from $R_{i'}$ and multi-dimensional coordinate i'' (4,3,0,A,7,7,B), and compared with the random number series $R_i$ when undivided. We can confirm the results are the same.

The required times for individually generating $R_{i'}$ and $R_{i''}$ through divided multi-dimensional coordinate are 0.001437 seconds and 0.001421 seconds, respectively, and the sum of those is close to the time 0.002781 seconds when undivided.

As mentioned above, even only the initial value and the multi-dimensional coordinate are changed, without changing calculation method, the subsystem is easily separated from the parent system. The calculated quantity is reduced after division, and the generation speed of the random number is faster.

In addition, because of division, it is not necessary for the lower degree system keeping the information of the upper degree system, thus, the upper degree system becomes safer from the viewpoint of information safety. Such as the situation of the product management system, when production department of certain product migrates abroad, the division of the management system is effective.

Figure 1:
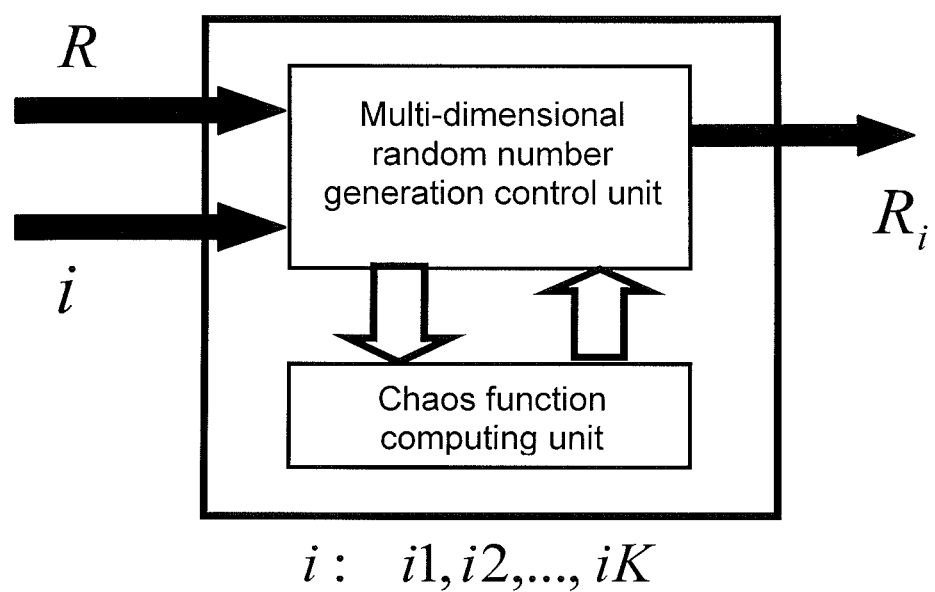
FIG. 1 is a schematic view of a system for generating and managing random number according to the present invention.

According to the present invention, the proposed method for generating and managing random number can generate and manage irregular M series N bits binary series $R_i$ through one series N bits binary series R (initial value) and regular M multi-dimensional coordinate information i (FIG. 1).

According to the present invention, the random number generation is performed through R and regular i to generate $R_i$, in which it is characterized that it is impossible to infer another features of $R_i$ or R through one given i or $R_i$. The random number generator with such features can be applied to a wide range of areas of information security.

One-time system for identification of ID and PW can be constructed through random number generation method of the present invention. That is, the secret (ID and PW) kept at system side and user side is used for R, R and new i are used for generating $R_i$ (for identification of ID and PW) at user side, and i and $R_i$ are delivered to system side for every identification. At system side, the received i and R of the user are used for generating $R_i$ compared with the delivered $R_i$ for identification. Because of one-time i, even if it is tapped, there would not be any problem. Also because of secret R without being delivered (through communication network), it is further safer. If R is made of information adopted from human body, such as fingerprint, vein, etc, it is not necessary to memorize R.

If the random number generation method of the present invention is applied to system for generating and managing key in encryption system, the so-called strongest encryption method is realized, that is, the encryption method with one-time key. Because multi-dimensional coordinate information i is only used once, it is impossible to use same key again.

If the random number generation method of the present invention is applied to common key encrypted communication, between two sides keeping same keys R, the information is encrypted by one-time key $R_i$. Only encrypted information and i are delivered, and it is not necessary to deliver R. The other side receiving the encrypted information and i uses kept R and i for generating $R_i$ to recover the information. Because R is not shown in communication, it is further safer.

Because the random number generation of the present invention calculates Equation 1 through fixed decimal point calculation, the calculation can be performed through integer operations. Also because integers can easily perform division calculation, even different calculation system, such as general-purpose computer (various OS), dedicated hardware, microcomputer, etc, only basic integer arithmetic implemented, for example, addition, multiplication, bit shift, logical operation between bits, etc, same output is obtained through same input.

Therefore, the random number generation device of the present invention has various combinations adapted for "performance-cost" needed, is highly scalable, and can be applied to a wide range of industries centered on information security areas.

As shown in the above, the present invention is described through embodiments, however, the technical means are not limited in the range of these embodiments. These embodiments can be modified or improved as needed. The present invention generates binary series through Equation 1, but the other methods generating binary series are available. Moreover, these embodiments can be modified on the basis of generation efficiency and features of random number. It is clear that, as for such modification, the improved patterns are included within the range of the technology of the present invention.

What is claimed is:

1. A method for generating and managing random numbers, comprising steps of:
   an input circuit setting a binary series R with binary integer having N bits (N≥2 and N is an integer) and multi-dimensional coordinate information i for K dimensions (i1, . . . , ik, . . . , iK) (ik is an integer, and ik ≥0, k:1, 2, . . . , K), wherein R is a decimal portion of an initial value $x_0$ for a nonlinear function, $x_{t+1}=4\,x_t(1-x_t)$ (hereinafter referred to as LMAP, $0<x_t<1$, t=0,1,2, . . . ), and said coordinate information i is then transformed into coordinate value of each dimension (i1, . . . , ik, . . . , iK) by a transforming circuit; and $x_0$, i1, . . . , ik, . . . , iK are stored in a register;
   1) according to the initial value $x_0$ and ik, an LMAP circuit implementing LMAP calculation having the accuracy of N bits through a fixed decimal point calculation, which is repeatedly done by chaos computing to generate N bits binary series $B_{ik}$, and bits of $B_{ik}$ are individually constituted by $b_{k\cdot 0}\ b_{k\cdot 1}\ \ldots\ b_{k\cdot N-1}$, wherein $b_{k\cdot 0}=[2\times x_{N\times i\ k}]$, $b_{k\cdot 1}=[2\times x_{N\times i\ k+1}]$, . . . and $b_{k\cdot N-1}=[2\times x_{N\times i\ k+N-1}]$, and [ ] represents a calculation of removing decimal portion;

2) a chaos computing circuit implementing the chaos computing on $B_{ik}$ as a decimal portion of the initial value $x_0$ after LMAP and repeatedly conducting calculation of the LMAP to generate and store an N bits binary series $R_{i1,\ldots,ik}$ (when k=1, $R_{i1,\ldots,ik}$ is $R_{i1,\ldots,iK}$; and when k=K, $R_{i1,\ldots,ik}$ is $R_{i1,\ldots,iK}$, wherein the bits of $R_{i1,\ldots,ik}$ are individually constituted by $r_{k\cdot 0}, r_{k\cdot 1}, \ldots$ and $r_{k\cdot N-1}$, and $r_{k\cdot 0}=[2\times x_N]$, $r_{k\cdot 1}=[2\times x_{N+1}]$, $\ldots$, $r_{k\cdot N-1}=[2\times x_{2N-1}]$, which are stored in a random number register;

3) using said $R_{i1,\ldots,ik}$ stored in the random number register as a decimal portion of initial value $x_0$ of the LMAP and storing it to said register; and a random number generation control circuit implementing the above operations 1), 2) and 3) as the order of k=1,2, ..., K, but when k=K, operation 3) is stopped, and operation 2) is used to generate $R_{i1,\ldots,iK}$ as random numbers.

2. A device for generating and managing random numbers, including:

an input circuit of generating and managing information for random number, which receives N (N is an integer, and N≥2) bits binary series R as an initial value information to generate random number, and multi-dimensional coordinates i for K dimensions (i1, ..., ik, ..., iK) (ik is an integer, and ik≥0;K is an integer, and K≥1) having multi-dimensional coordinate information;

an initial value/multi-dimensional coordinates transformation circuit, which transforms R, decimal portion of initial value $x_0$ for nonlinear function, $x_{t+1}=4x_t(1-x_t)$ (herein after referred to as LMAP, $0<x_t<1$), into $x_0$, and transforms i into multi-dimensional coordinates i1, ..., ik, ..., iK for the LMAP to generate random number;

a memory, which stores the initial value $x_0$ and multi-dimensional coordinates i1, ..., ik, ..., iK transformed by the initial value/multi-dimensional coordinates transformation circuit;

a chaos computing circuit generating chaos binary series, which repeatedly implements calculation of the LMAP in N bits calculation through a fixed decimal point calculation, on the basis of the initial value $x_0$ and multi-dimensional coordinates stored in the register, to generate N bits binary series $B_{ik}$, bits of $B_{ik}$ are individually constituted by $b_{k\cdot 0}\ b_{k\cdot 1} \ldots b_{k\cdot N-1}$, wherein $b_{k\cdot 0}=[2\times x_{N\times i\ k}]$, $b_{k\cdot 1}=[2\times x_{N\times i\ k+1}]$, $\ldots$ and $b_{k\cdot N-1}=[2\times x_{N\times i\ k+N-1}]$, and [ ] represents an operator used to remove decimal portion, and $B_{ik}$ is used for the decimal portion of initial value $x_0$ and transformed into $x_0$ through the chaos computing circuit repeatedly implementing the calculation of the LMAP to generate N bits binary series $R_{i1,\ldots,ik}$, $R_{i1,\ldots,ik}$ is $R_{i1}$ when k=1, ..., $R_{i1,\ldots,ik}$ is $R_{i1,\ldots,iK}$ when k=K, and the bits of $R_{i1,\ldots,ik}$ are individually constituted by $r_{k\cdot 0}$, $r_{k\cdot 1}$, ... and $r_{k\cdot N-1}$, wherein $r_{k\cdot 0}=[2\times x_N]$, $r_{k\cdot 1}=[2\times x_{N+1}]$, $\ldots$, $r_{k\cdot N-1}=[2\times x_{2N-1}]$;

a random number memory, which stores N bits binary series $R_{i1,\ldots,ik}$ output by the chaos computing circuit; and a random number generation control circuit, which implements following operations, including an operation of the input circuit of generating and managing information for random number, an operation of the initial value/multi-dimensional coordinates transformation circuit, a calculation of the chaos computing circuit, and a calculation of $x_0$ transformed from $R_{i1,\ldots,iK}$ as the decimal portion of the initial value $x_0$ of the LMAP, as the order of k=1,2, ..., K, but $R_{i1,\ldots,iK}$ do not perform the transformation of the initial value $x_0$ of the LMAP when k=K, to generate multi-dimensional random number $R_i$.

\* \* \* \* \*